United States Patent [19]

Ho et al.

[11] Patent Number: 4,841,467

[45] Date of Patent: Jun. 20, 1989

[54] ARCHITECTURE TO IMPLEMENT FLOATING POINT MULTIPLY/ACCUMULATE OPERATIONS

[75] Inventors: Chung-Yih Ho, Schenectady; Karl J. Molnar, Clifton Park; Daniel A. Staver, Scotia, all of N.Y.

[73] Assignee: General Electric Company, Schenectady, N.Y.

[21] Appl. No.: 104,453

[22] Filed: Oct. 5, 1987

[51] Int. Cl.$^4$ .............................................. G06F 7/38
[52] U.S. Cl. ................................................... 364/748
[58] Field of Search ......................................... 364/748

[56] References Cited

U.S. PATENT DOCUMENTS

| | | | |
|---|---|---|---|
| 4,511,990 | 4/1985 | Hagiwara et al. | 364/748 |
| 4,589,067 | 5/1986 | Porter et al. | 364/748 |
| 4,683,547 | 7/1987 | DeGroot | 364/748 |

OTHER PUBLICATIONS

Earle et al., "Exponent Differences and Preshifter", *IBM Technical Disclosure Bulletin*, vol. 9, No. 7, Dec. '66, pp. 848–849.
Sproul, "High-Speed Floating-Point Accumulator", *IBM Tech. Disclosure Bulletin*, vol. 14, No. 10, Mar. 72, pp. 2934–2936.
"An IEEE Standard Floating Point Chip", A. Komal, K. Goskel, Phil W. Diodato, John A. Fields, Ulhas V. Gumaste, Chaw K. Kung, Kingyao Lin, Mario E. Lega, Peter M. Maurer, Thomas K. Ng, Yaw T. Oh, Mark E. Thierbach-AT&T Bell Labs., 1985, IEEE Intnl. Solid-State Circuits Conf.-Feb. 13, 1985, pp. 18–19.
"A Single Chip 80b Floating Point Processor"-Karumitsu Takeda, Fumiaki Ishino, Yoshitaka Ito, Ryota Kasai, Takayoshi Nakashima, NTT Atsugi Electric Comm. Lab.-1985 IEEE Intnl. Solid-State Circuits Conf.-pp. 16–17.
"An NMOS 64b Floating-Point Chip Set"-William M. McAllister, Dan Zuras, Hewlett-Packard Co., 1986 IEEE Intnl. Solid-State Circuits Conf.-Feb. 19, 1986, pp. 34–35.
"A 32b Floating Point CMOS Digital Signal Processor", Yuichi Kawakami, Hideo Tanaka, Tomoji Nukiyama, Makoto Yoshida, Takeo Nishitani, Ichiro Kuroda, Minoru Araki, Ioshiaki Hoshi-NEC Corp., Kawasaki, Japan, 1986 IEEE Intnl. Solid-State Cir. Conf., Feb. 19, 1986-pp. 86–87.
"A 64b Floating Point Processor"-Frederick A. Ware, Hewlett-Packard Co.-1982 IEEE International Solid-State Circuits Conf.-pp. 24–25.

*Primary Examiner*—David H. Malzahn
*Attorney, Agent, or Firm*—Allen L. Limberg; James C. Davis, Jr.; Marvin Snyder

[57] ABSTRACT

A multiply/accumulator chip architecture capable of operating at a 20 megahertz system clock rate is designed so as to accept floating point numbers in sign magnitude form, to compute a product of the fractional portions thereof and to convert the fractional result into two's complement form for accumulation with the results of a previous product. This architecture readily permits the computation of vector-type inner product operations in a high speed pipelined fashion. Additionally, leading zero's and leadings one's detection is carried out in a multiply parallel fashion so as to rapidly produce post normalization results from the additive portion of the system. The system is implementable on a single integrated circuit chip in which an array multiplier is present so as to minimize inter-chip delays. The architecture of the present invention provides a high speed floating point multiply and accumulate operation with a short pipeline latency.

11 Claims, 2 Drawing Sheets

$$N = (-1)^S \times 2^{(E-127)} \times (1.F)$$

ARCHITECTURE TO IMPLEMENT FLOATING POINT MULTIPLY/ACCUMULATE OPERATIONS

BACKGROUND OF THE DISCLOSURE

The present invention is generally directed to a system for performing pipelined multiply and accumulate operations. More particularly, the present invention is directed to a circuit for multiplying a pair of floating point numbers in sign-magnitude form and accumulating a sum of such products in two's complement form. The circuitry of the present invention is implementable on a single VLSI integrated circuit chip operating at a pipeline clock rate of 100 nanoseconds.

In mathematics, physics and computer graphics, it is often very highly desirable to be able to compute inner products of vector quantities. Such inner products are almost always formed as the arithmetic sum of the arithmetic products of corresponding vector components. In order to carry out these inner product operations, pipelined architectures are used. Such architectures employ multipliers and adders in which floating point operations are carried out in two basic stages, namely multiplication followed by addition. Multiplication is often done by means of an array multiplier. However, and most importantly for consideration of the present invention, it is noted that the subsequent addition and/or subtraction operations require a more complicated sequence of events than is necessary.

In floating point addition and/or subtraction operations, the following basic seven steps are required to actually execute the addition/subtraction operation. (1) It is first necessary to compare the two exponent fields of the floating point numbers to determine an exponent difference. (2) Next, the fractional part (mantissa) of the floating point number having the smaller exponent is 'denormalized'. This means that the specified mantissa is shifted so as to produce floating point numbers having the same exponent. (3) Next, the denormalized mantissa is added to or subtracted from the mantissa with the larger exponent or vice versa depending upon the signs of the operands. (4) Next, the sign of the result is determined. (5) Following sign determination, the result is converted into a signed-magnitude representation. (6) After conversion, the number of leading zeros of the result is determined. Here is it important to bear in mind that leading zeros can result from addition and/or subtraction operations in which the high order bits cancel one another. (7) Lastly, the result must be normalized and correspondingly the resulting exponent must be adjusted in concert with the normalization process carried out for the fractional part of the result.

Floating point processors available on the market have, however, failed to achieve as high a speed of operation as the present invention has made possible. In particular, floating point processing chips and devices have in the past employed individually short pipeline stages arranged in a long sequence of pipeline events. Such systems, however, suffer from an unduly long pipeline latency. Long pipeline latency prevents the users from integrating such systems effectively and efficiently. On the other hand, short pipeline latency systems often suffer from low speed operation.

SUMMARY OF THE INVENTION

In accordance with a preferred embodiment of the present invention, multiplication is carried out in a signed-magnitude representational system following which accumulation of data is carried out in two's complement format following conversion to this format from the output of the multiplier. Such a system offers the advantage that the number of operational steps required to complete floating point addition/subtraction operations is reduced from seven to five. More particularly, in the system of the present invention, sign determination and conversion back to signed-magnitude representation are eliminated.

Furthermore, in preferred embodiments of the present invention, parallel leading zero and leading one encoding systems are employed to detect the number of leading zeros for a positive number and the number of leading ones for a negative number. Through the use of this approach, floating point accumulation is accomplished in five stages and has been designed to operate within a single 100 nanosecond system clock cycle. Consequently, the floating point multiply/accumulate operation of the present invention is executed in two 100 nanosecond clock cycles. By pipelining these two operations, the design achieves a floating point multiply/accumulate in every 100 nanosecond clock cycle.

Accordingly, it is an object of the present invention to provide a generic architecture to accomplish floating point operations such as addition or subtraction in a single cycle and to accomplish multiply/accumulate operations in two cycles.

It is also an object of the present invention to provide a circuit for performing up to 20 million single precision floating point multiply/accumulator operations with a pipeline latency of two 100 nanosecond clock periods.

It is another object of the present invention to eliminate the execution of unnecessary sign determination and conversion results from addition/subtraction operations performed in conjunction with floating point multiply/accumulate devices.

It is a still further object of the present invention to reduce the latency in pipelined floating point multiply/accumulate processors.

It is a still further object of the present invention to facilitate the performance of vector inner product operations.

It is a still further object of the present invention to provide a special purpose floating point multiply/accumulate VLSI chip for use in graphical processing operations.

It is yet another object of the present invention to perform leading zero and leading ones detection in parallel.

Lastly, but not limited hereto,, it is an object of the present invention to provide in parallel an a priori method for performing post normalization of adder results.

DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
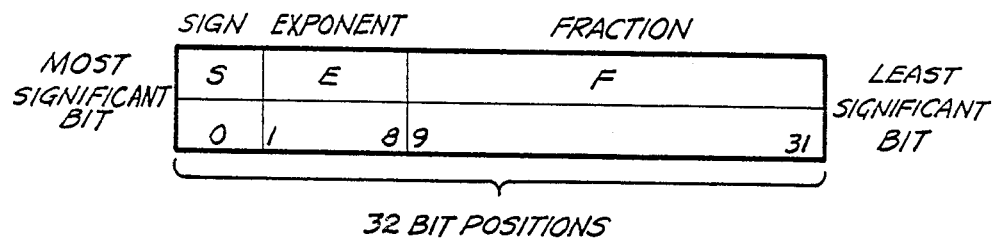
FIG. 1 is a block diagram illustrating a standard sign-magnitude representation for a single precision, 32 bit floating point number showing in particular sign, exponent and fraction fields.

FIG. 1 illustrates the format of the floating point numbers accepted as input to the multiply/accumulate circuitry of the present invention. In particular, it is seen that the numbers to be multiplied are in sign-magnitude form. In the example illustrated in FIG. 1, a 32 bit floating point number representation is illustrated. These 32 bits lie in bit positions labeled 0 through 31. In particular, the leftmost or bit position, bit position 0, is occupied by the sign bit. While either of two possibilities for sign representation may be employed, it is preferred herein that the sign-magnitude representation conform to accepted standards for floating point numbers. The standard shown in FIG. 1 is a subset of the standard IEEE-754 format for single precision floating point numbers. In particular, in the rest of the discussion herein, it will be assumed that a sign bit which is 0 represents a positive number, while a sign bit of 1 indicates a negative number In the representation shown in FIG. 1, eight bits are allotted to an exponent field. The exponent field thus occupies bit positions 1 through 8 (inclusive) as shown. In accordance with various embodiments of the present invention, the exponent representation may in general comprise a number of different schema. However, with eight bits allotted to the exponent, it is possible to represent 256 different exponent values. It is also particularly important to bear in mind that, as used herein, the exponent represents a power of 2, not a power of 10. In preferred embodiments of the present invention, the aforementioned standard is adhered to and accordingly, the exponent field used in the representation is 127 higher than its actual value. This shift by 127 permits exponents which are actually negative to be stored readily. Accordingly, to determine the actual exponent, the number 127 (which is 1111111 in binary) is subtracted from the binary number shown in the exponent field of the floating point representation.

Lastly, the fractional or mantissa portion of the number is stored in bit positions 9 through 31. This fraction always represents a magnitude. It is further assumed that the binary point and a leading binary digit 1 is present to the left of the leftmost fractional bit position. The binary point and leading non-zero digit are assumed to be present and are not stored or represented as such. Thus, in the representation shown in FIG. 1, 23 bits are associated with the fractional part of the floating point number. The above discussions with respect to number representation may be summarized by stating that the sign bit S, the exponent E and the fraction F represent the number N where $$N = (-1)^S \times 2^{(E-127)} \times (1.F)$$

In the present system, a zero value is indicated by a zero exponent field. It should be appreciated though that the specific format shown in FIG. 1 is only one of many possible sign-magnitude representations that may be exploited in accordance with the present invention. In particular, it is noted that the present invention is not specifically limited to the utilization of a 32 bit field, nor is there any limitation with respect to positioning of these fields. That is to say, it is equally possible in keeping with the present invention that the fraction field occupy the leftmost bit positions. It is also noted that the example embodiments presented herein have been specifically addressed to the construction of a single precision floating multiply/accumulate circuit, disposed on a single integrated circuit chip, and capable of operating at a 20 megahertz clock rate. Naturally, some variation in design details will occur for other formats and other field sizes. However, such variations are well within the skill of the ordinary practitioner in the logic design arts.

Figure 2:
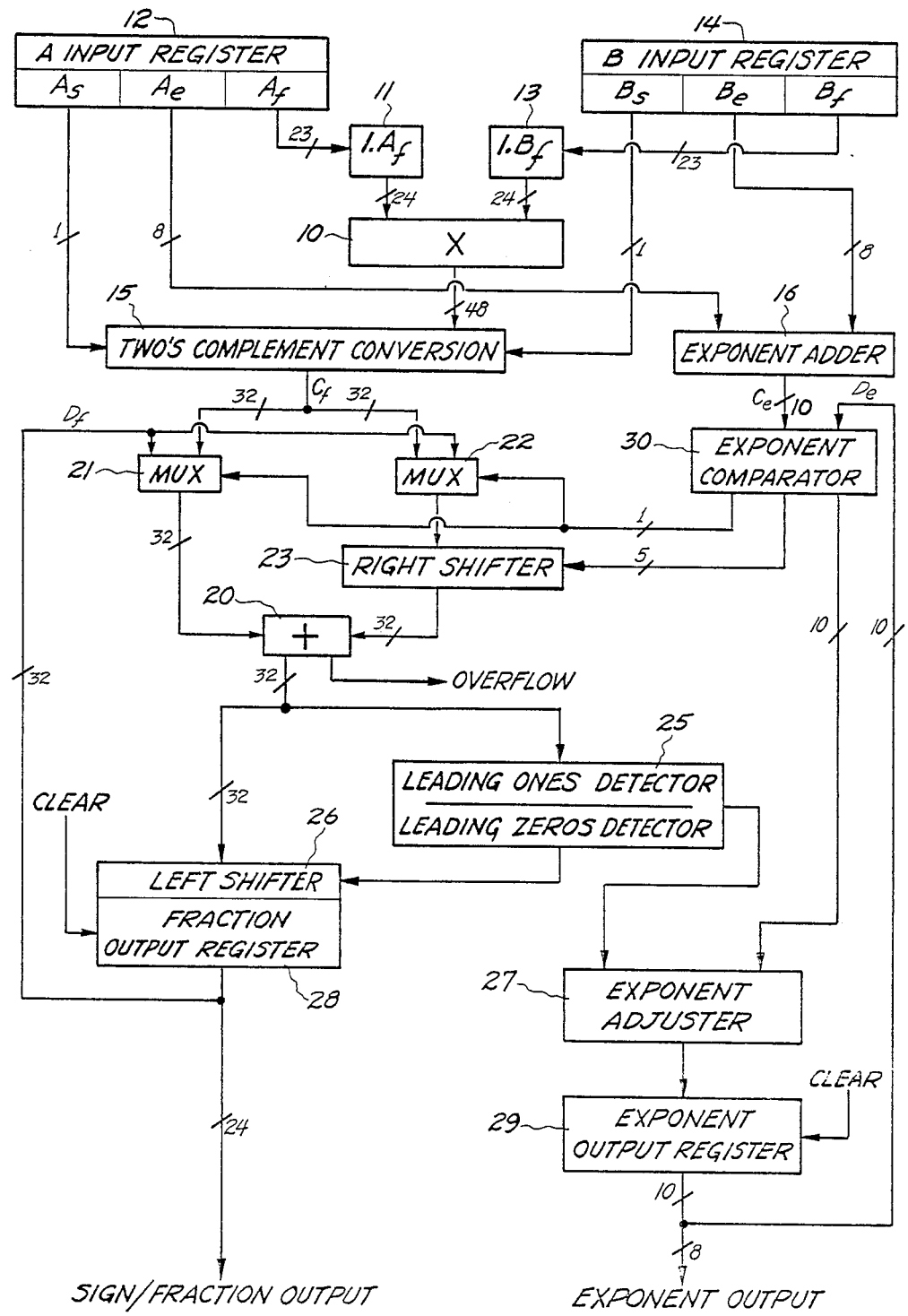
FIG. 2 is a block diagram of a floating point multiply/accumulate system in accordance with the present invention.

FIG. 2 illustrates a circuit in accordance with the present invention for carrying out the desired multiply and accumulate operations. In particular, it is noted that from an overall flow diagram viewpoint, the essential operations of the present invention are carried out by means of multiplier 10, two's complement converter 15 and adder 20. Significant advantages are achieved in the present invention by employing a sign-magnitude representation for floating point multiplication while employing a two's complement number representation for accumulation (that is, addition to a previously determined result). It is also noted that exponent operations are carried out in essentially parallel operating paths. It is also noted that the various signal paths shown in FIG. 2 are provided with hatch marks and numbers indicating binary path width. These widths are shown in FIG. 2 only for convenience and for considering the particular example presented herein, namely that of a single chip operating at a clock rate of 20 megahertz. Also for convenience, it is noted that the circuit shown in FIG. 2 accepts an input floating point number A and a second input floating point number B which is multiplied to produce a result C which is added to a previously accumulated result D. It is further noted that labels such as f and e are employed as subscripts on the letters A, B, C and D to indicate association either with the fractional field or with the exponent field.

In particular, for input there is provided an A input register 12 and a B input register 14 as shown with their associated sign, exponent and fractional fields. In the embodiment of the present invention actually constructed, the two sets of inputs, A and B, were multiplexed over 32 input pads. In order to match the internal speed of the device, half of the operands arrive every 50 nanoseconds, high order bits first, followed by the low order bits. Internal accuracy is maintained by using a 32 bit mantissa and a 10 bit exponent. Overflow and underflow indications are provided for out-of-range numbers. Multiplication or accumulation producing an overflow result is clamped by hardware to the maximum positive or negative number depending upon the sign bit, while an underflow result is clamped to 0. In the output registers, the smallest non-zero numbers representable are $\pm 1.0 \times 2^{-126}$. On the other hand, irrespective of sign, the maximum numbers representable are $\pm 1.11111111111111111111111 \times 2^{+128}$. Each of the two 32 bit data inputs are time multiplexed over a set of 16 input pads. The 16 most significant of each input arrive during the first clock cycle of the system clock and the 16 least significant bits during the second clock cycle. The 32 bit result is presented in parallel on the 32 output pads. Once locked into registers on the chip, fractional field $A_f$ and $B_f$ are supplied to multiplier 10; however, functional blocks 11 and 13 indicate that the assumed leading one bit is provided in the leftmost input field constituting the multiplier operands. The multiplier employed is preferably an array multiplier and is disposed on the same integrated circuit chip as the rest of the circuitry shown in FIG. 2. Accordingly, the output of multiplier 10 is a 48 bit fractional magnitude number. It is adjusted to standard form with a leading one bit in the leftmost output position from multiplier 10. In accordance with a significant aspect of the present invention, the resultant fractional multiplicand from multiplier 10 is converted to a two's complement representation via functional block 15. The conversion, at this stage to a two's complement number representation, is a significant aspect of the present invention in that it permits two steps of the conventional addition/subtraction operation to be avoided. In particular, steps 4 and 5, namely sign determination and conversion into a signed-magnitude representation can be eliminated. This provides significant speed-up advantages for the circuit of the present invention. More particularly, in the design of the specific chip implemented in accordance with the present invention, the number representation conversion was responsible for permitting the desired operations in a time commensurate with the 20 megahertz clock period. While it would be possible to carry all 48 bits from multiplier 10, it is noted that since the input precision of the multipliers A and B are limited to 23 fractional bits, it would generally be undesirable to carry all of them. However, to ensure maximum practical accuracy, only bits from two's complement converter 15 are carried to the adder/accumulator portion of the circuit. It is noted that two's complement converter 15 performs an operation which is standard and well known, namely logical inversion together with the addition of a single one bit in the low order position when the sign of the product is negative. Also note that the two's complement conversion is carried out for integer zero sign bit followed only by the fractional portion $C_f$ of the result C.

It is also noted that exponent adder 16 receives exponent fields $A_e$ and $B_e$ and produces a result $C_e$ which is indicative of the exponent of the product of the two floating point numbers supplied. More particularly, $C_e$ equals the sum of $A_e$ plus $B_e$ plus a number added to compensate for any shift of the result C that is needed to adjust it to standard form before completing two's complement conversion 15. It is also noted that it is desirable for exponent adder 16 to also add a binary 1110000001 to the result, to compensate for the fact that each of the exponent fields are biased by a decimal 127, and the number of bits of right shift required in multiplier 10 to place the product in standard format.

The rest of the circuitry shown in FIG. 2 is associated with addition/subtraction and accumulation operations. There are two aspects of the addition of floating point numbers. First, prior to addition of these numbers, one of them must be shifted so as to align their assumed binary points. Secondly, subsequent to the addition operation, it is necessary to detect leading ones and leading zeros and to perform crresponding post normalization operations depending upon the results of this detection to produce output in standard form. Thus, the discussion below with the respect to the remaining portion of the circuitry shown in FIG. 2 can be divided into two portions, namely that occurring prior to the functioning of adder 20 and that occuring subseqent to the operation of this adder. It is in particular also noted that with respect to adder 20, that its addends are the (usually shifted) fractional parts of C and D respectively, namely $C_f$ and $D_f$.

Figure 3:
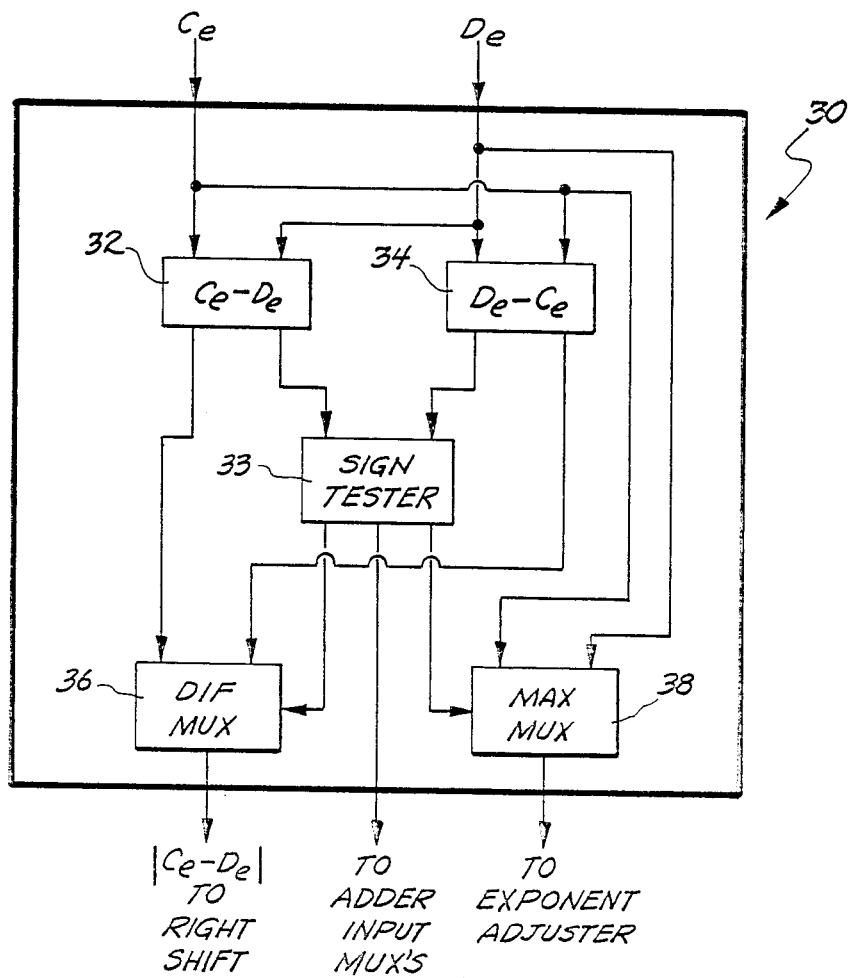
FIG. 3 is a block diagram of the exponent comparator from FIG. 2 shown in more complete detail.

The next important operation carried out by the circuitry shown in FIG. 2 is performed by exponent comparator 30. This circuitry is more particularly described below with respect to FIG. 3. Suffice it to say for now that exponent comparator 30 operates to produce three outputs as a result of two preferably parallel subtraction operations which are performed therein. Firstly, comparator 30 produces an output of $|C_e\text{-}D_e|$ which represents the amount by which one of the fractional components must be shifted to achieve the desired alignment. This value is supplied to right shifter 23. Additionally, exponent comparator 30 produces an output which represents the larger of either $C_e$ or $D_e$. As indicated above, it is noted that $D_e$ represents the exponent field of the previously accumulated output. Also as above, it is to be borne in mind that the previous output is in fact one of the present addends. It is this latter output ($C_e$ or $D_e$) which represents the exponent of the result prior to adjustment for leading one's or zero's detection. Lastly, but most importantly for the present discussion, comparator 30 produces a single bit output which is based upon the sign of the difference between $C_e$ and $D_e$. This single bit output indicates which of the two fractional portions, $D_f$ or $C_f$ is right shifted by shifter 23. This is accomplished by supplying the single bit signal to multiplexers 21 and 22 as shown. Based upon the single bit result from comparator 30, the multiplexer set 21 and 22 operates to supply the fractional part having the lower exponent to right shifter 23 which causes a shift in binary alignment by an amount also determined from the above-mentioned absolute value of the difference between $C_e$ and $D_e$ from comparator 30. Accordingly, the output of multiplexer 21 and right shifter 23, both in two's complement form, are supplied to the two inputs to adder 20. As a result, a 32 bit sum results. Additionally, adder 20 is provided with means for indicating overflow conditions, in accordance with standard two's complement adder circuitry functioning.

In the event that the addition operation has resulted in the occurrence of leading zeros (for positive results) or leading ones (for negative results), shifting and exponent adjustments must be performed to place the results in normalized form. Accordingly, the output from adder 20 is provided to leading one's detector and leading zero's detector 25. The leading one's detection and leading zero's detection operations are preferably performed in parallel. That is to say, for the sake of speedier operations, both detection operations are performed with only the desired result being supplied to exponent adjuster 27 and left shifter 26. Furthermore, for the sake of speedier operation, an additional level of parallelism is also present in the leading zero's and leading one's detectors individually. Moreover, since it is generally more natural to comprehend, consideration is now given to the specific means for leading zero's detection. In particular, since there is a 32 bit result from adder 20 and because of various circuit design limitations (fan in and fan out), these 32 bits are divided into 8 blocks of 4 bits each. Each of these blocks receives 4 bits and produces a signal indicative of the number of leading zeros. In the event that all of the inputs to a particular block are 0, the block generates a carry signal. This carry signal is supplied to the adjacent lower order 4-bit zero detection block. A subsequent circuit level examines the outputs of the 8 4-bit zero's detection blocks and generates a signal which is indicative of the actual number of leading zeros in the 32 bit field. This signal is applied to exponent adjustor 27 which subtracts this number from the output exponent field from comparator 30. In a similar way, this signal is applied to left shifter 26 which operates on the 32 bit field from adder 20 to adjust the fractional output appearing in fraction output register 28 so as to correspond to the exponent appearing in exponent output register 29. It is also noted that while shifter 26 and register 28 are illustrated in FIG. 2 as separate circuit entities, it is generally desirable that this functionality be combined in a single shift register. In the present example, this shift register possesses 32 bits, the most significant 24 of which are supplied to output pads on the chip as part of the sign-fraction output. In a similar fashion, 8 bits from the exponent output register 29 are also supplied to chip output pads.

Attention is now specifically directed to exponent comparator 30 which receives input signals $C_e$ and $D_e$. Again for sake of speed, two separate subtraction operations are performed in subtractors 32 and 34 as shown. Subtractor 34 produces the result $C_e-D_e$. Correspondingly subtractor 34 produces the result $D_e-C_e$. These results are supplied to sign tester 33 which produces a single hit signal indicative of which one of $C_e$ and $D_e$ is larger. It is this single bit result which causes multiplexers 21 and 22 to select the appropriate fractional bits for shifting the right shifter 23. Sign tester 33 also provides singlr to difference multiplexer 36 enabling it to select an output from either subtractor 32 or 34 in such a way that the difference is always positive. It is this positive difference which is supplied to right shifter 23. In a similar fashion, sign tester 33 also provides a single bit signal to maximum multiplexer 38 which operates to select which of the inputs is larger. It is the larger of these two inputs which represents the exponent of the result (again, apart from post addition normalization).

From the above, it should be appreciated that the present invention provides a multiply/accumulate function operating by performing multiplication in sign-magnitude representational format and by accumulating data in two's complement format. This system combination reduces the number of operational steps required to complete the floating point addition/subtraction operation from seven to five steps. Sign determination and conversion back to sign-magnitude representation are eliminated. Furthermore, using parallel leading zero and leading one detection operations, the number of leading zeros for a positive number and the number of leading ones for a negative number is determined quickly. By utilizing the approach of the present invention, floating point accumulation is accomplished in five stages which are capable of operation within a single 100 nanosecond system clock cycle. Consequently, the floating point multiply/accumulate operation of the present invention is executed in two 100 nanosecond clock cycles. By pipelining these operations, the design of the present invention achieves a floating point multiply/accumulate operation in every 100 nanosecond clock cycle.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A system for multiplication of successive pairs of floating point binary numbers and for accumulation of the products from such multiplictjon to generate a running result, each of said floating point numbers comprising a sign filed and a fraction field that express a signed magnitude and further comprising an exponent field, said system comprising:

means for temporarily storing the previous value of said running result, when such there is, including means for temporarily storing a two's complement number descriptive of the sign field and fraction field of said previous value of said running result, and including means for temporarily storing an exponent field of said previous value of said running result, which exponent field is associated with the temporarily stored two's complement number;

means responding to the fraction fields of each said successive pair of floating point binary numbers for generating a respective product of a respective pair of quantities, one of which respective quantities is integer one plus a fraction that is the fraction field of one of said successive pair of floating point binary numbers, and the other of which respective quantities is integer one plus a fraction that is the fraction field of the other of said successive pair of floating point binary numbers, said standard form being integer one plus a fraction;

means responding to the exponent fields of each successive pair of floating point binary words for determining an exponent field associated with the product generated from their fraction fields;

means responding to the sign fields of each said pair of floating point binary numbers for converting each said respective product to a two's complement number with which the exponent field associated with the product is also associated;

means for aligning the resulting two's complement number descriptive of the product and the temporarily stored two's complement number, by shifting the one of those two's complement numbers having a lower exponent field associated therewith than the other of those two's complement numbers;

means for adding the aligned two's complement numbers as received at respective ones of a first input port thereof and a second input port thereof, to generate a sum in two's complement form at an output port thereof;

means normalizing the sum for generating a replacement two's complement number used to replace the two's complement number descriptive of the sign field and fraction field of said previous value of said running result in said means for temporarily storing a two's complement number, said means normalizing the sum including means for determining the number of sign bit repetitions in said sum and including first data shifter means for shifting said sum by that number of bits towards increased significance to generate said replacement two's complement number; and means for adding the number of sign bit repetitions to the larger of the exponent fields respectively associated with the product and associated with the previous value of the running result, thereby generating a replacement exponent field used to replace the exponent field of said previous value of said running result in said means for temporarily storing same.

2. A system as set forth in claim 1 wherein said means for temporarily storing the previous value of running result, when such there is, is of a type including
means for replacing the previous value of running result with a preselected value at selected times responsive to a command to clear, whereby said accumulation can be started over from said preselected value.

3. A system as set forth in claim 1 including input registers for storing each said successive pair of floating point binary numbers.

4. A system as set forth in claim 1 wherein said means for responding to the fraction fields of each said successive pair of floating point binary numbers for generating a respective product, said means for aligning, and said means for adding the aligned two's complement numbers are operable in a pipelined fashion.

5. A system as set forth in claim 4 wherein said means responding to the fraction fields of each said successive pair of floating point binary numbers for generating a respective product comprises:
means responding to the fraction field of one of each said successive pair of floating point binary numbers for generating said first quantity;
means responding to the fraction field of the other of that successive pair of floating point binary numbers for generating said second quantity; and
an array multiplier for multiplying together said first and second quantities to generate said respective product.

6. A system as set forth in claim 1 wherein said means responding to the fraction fields of each said successive pair of floating point binary numbers for generating a respective product comprises:
means responding to the fraction field of one of each said successive pair of floating point binary numbers for generating said first quantity;
means responding to the fraction field of the other of that successive pair of floating point binary numbers for generating said second quantity; and
an array multiplier for multiplying together said first and second quantities to generate said respective product.

7. A system as set forth in claim 1 disposed on a single integrated circuit chip.

8. A system as set forth in claim 1 wherein said means for aligning includes:
comparator means for comparing the exponent fields associated with the product and with the temporarily stored previous value of said running result to generate a control signal indicative of whether one of those exponent fields is larger or smaller than the other and a shift signal indicating the number by which the larger exponent field exceeds the smaller;
second data shifter means for shifting data received at an input port thereof by that number of bits towards reduced significance indicated by said shift signal, to appear at an output port thereof connected to the first input port of said means for adding the aligned two's complement numbers;
first and second multiplexer means, each responding to said control signal for respectively supplying, to the input port of said second data shifter means and to the second input port of said means for adding the aligned two's complement numbers, the one of those two's complement numbers having the smaller exponent field associated therewith and the one of those two's complement numbers having the larger exponent field associated therewith.

9. An accumulator for numbers each represented by a respective input electric signal, used to generate accumulation results each represented by a respective output electric signal, each said electric signal comprising a respective plural-bit fraction field and a respective plural-bit exponent field, said exponent field specifying with an offset the integral portion of the logarithm base two of the absolute value of the number that electric signal represents and said fraction field specifying in two's complement form the fractional portion of that number normalized to unit integer plus fraction standard form, said accumulator comprising:
means for temporarily storing each said output electric signal from the time of its generation until the time of generation of the next further electric signal, said means for temporarily storing including a fraction field register and an exponent field register;
a two's complement digital adder having first and second input ports and an output port for supplying a digital sum signal;
means for differentially comparing the exponent field of a current input electric signal with the exponent field of a most recent output electric signal, to generate a control signal indicative of which is the larger, and to generate a right shift signal specifying how many orders of magnitude it is larger;
means responsive to said control signal for selecting as a first selected signal the fraction field of the larger of the current input electric signal and the most recent output electric signal to the first input port of said digital adder;
means responsive to said control signal for selecting as a second selected signal the fraction field of the smaller of the current input electric signal and the most recent output electric signal;
means responding to said right shift signal to shift said second selected signal the specified orders of magnitude towards decreased significance for application to the second input port of said digital adder;
means for normalizing said digital sum signal, including
means for determining the number of sign bit repetitions in said sum signal to generate a left shift signal indicative of how many orders of magnitude by which to shift the digital sum signal, and including
means responding to said left shift signal to shift said sum signal the specified orders of magnitude towards decreased significance to normalize it before application to said means for temporarily storing said output electric signal, for updating the fractional field stored therein;
means adding the larger of the exponent fields of the current input electric signal and the most recent output electric signal for application to said means for temporarily storing said output electric signal for updating the exponent field storing therein.

10. An accumulator as set forth in claim 9 in combination with:
means for supplying as said input electric signals a succession of pairs of numbers, each product being in two's complement form.

11. An accumulator as set forth in claim 10 wherein said means for supplying products comprises:
means for multiplying said pairs of numbers in signed-magnitude format to generate products in signed-magnitude format; and
means for converting said products in signed-magnitude format to two's complement form.

* * * * *